US012192067B2

(12) United States Patent
Nassar et al.

(10) Patent No.: US 12,192,067 B2
(45) Date of Patent: Jan. 7, 2025

(54) CLOUD ARCHITECTURE INTERPRETATION AND RECOMMENDATION ENGINE FOR MULTI-CLOUD IMPLEMENTATION

(71) Applicant: International Business Machines Corporation, Armonk, NY (US)

(72) Inventors: Nader M. Nassar, Yorktown Heights, NY (US); Chris Dotson, Lexington, KY (US); Annuschka Bork, New York City, NY (US); Todd D. Deloach, Bethel, CT (US); Samuel S. Grummons, Newtown, CT (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/506,095

(22) Filed: Oct. 20, 2021

(65) Prior Publication Data

US 2023/0120379 A1    Apr. 20, 2023

(51) Int. Cl.
*H04L 41/22* (2022.01)
*G06F 3/0482* (2013.01)
*H04L 67/10* (2022.01)
*G06F 8/60* (2018.01)

(52) U.S. Cl.
CPC ............ *H04L 41/22* (2013.01); *G06F 3/0482* (2013.01); *H04L 67/10* (2013.01); *G06F 8/60* (2013.01)

(58) Field of Classification Search
CPC ............................. H04L 41/22; H04L 67/10
See application file for complete search history.

(56) References Cited

U.S. PATENT DOCUMENTS

| 10,089,082 | B2 * | 10/2018 | Douglas | G06F 8/34 |
| 10,693,805 | B2 * | 6/2020 | Povolny | H04L 41/5051 |
| 10,884,732 | B1 | 1/2021 | Zolotow et al. | |
| 10,956,242 | B1 * | 3/2021 | Kumar | G06F 8/76 |
| 10,970,135 | B2 | 4/2021 | Luck et al. | |

OTHER PUBLICATIONS

Artac et al.; "Infrastructure-as-Code for Data-Intensive Architectures: A Model-Driven Development Approach"; 2018 IEEE International Conference on Software Architecture; 2018; pp. 156-165.
Bhattacharhee; MDE-based Automated Provisioning and Management of Cloud Applications; 4 Pages.
(Continued)

*Primary Examiner* — Hua Fan
(74) *Attorney, Agent, or Firm* — CANTOR COLBURN LLP; Erik Johnson

(57) ABSTRACT

Examples described herein provide a computer-implemented method that includes receiving source code to implement on the cloud infrastructure. The method includes receiving user-defined requirements. The method further includes determining, based on the source code and the user-defined requirements, multiple suitable cloud architectures from a plurality of cloud providers to operate the source code on the cloud infrastructure. The method further includes presenting, to a user, the multiple suitable cloud architectures. The method further includes implementing a selected cloud architecture for the cloud infrastructure based on a selection by the user.

18 Claims, 9 Drawing Sheets

(56) References Cited

OTHER PUBLICATIONS

Bhattacharjee et al.; "CloudCAMP: Automating Cloud Services Deployment & Management"; Retrieved Online from arXiv:1904.02184v2 [cs.SE]; Apr. 9, 2019; 12 Pages.

Nitto et al.; "An Approach to Support Automated Deployment of Applications on Heterogeneous Cloud-HPC Infrastructures"; 2020 22nd International Symposium on Symbolic and Numeric Algorithms for Scientific Computing (SYNASC); 2020; pp. 133-140.

* cited by examiner

CLOUD ARCHITECTURE INTERPRETATION AND RECOMMENDATION ENGINE FOR MULTI-CLOUD IMPLEMENTATION

BACKGROUND

Embodiments described herein generally relate to cloud computing, and more specifically, to a cloud architecture interpretation and recommendation engine for a multi-cloud implementation.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include different characteristics, service models, and deployment models.

SUMMARY

In one exemplary embodiment, a computer-implemented method for creating a cloud infrastructure is provided. The method includes receiving source code to implement on the cloud infrastructure. The method includes receiving user-defined requirements. The method further includes determining, based on the source code and the user-defined requirements, multiple suitable cloud architectures from a plurality of cloud providers to operate the source code on the cloud infrastructure. The method further includes presenting, to a user, the multiple suitable cloud architectures. The method further includes implementing a selected cloud architecture for the cloud infrastructure based on a selection by the user Other embodiments of the present invention implement features of the above-described method in computer systems and computer program products.

The above features and advantages, and other features and advantages, of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the scope of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide a cloud architecture interpretation and recommendation engine for a multi-cloud implementation. Particularly, one or more embodiments provide for defining an architecture as a layer of abstraction using vendor agnostic declarative statements and providing multiple recommendations for implementing that architecture based on what source code would support and user-defined requirements, which can then be implemented through an interpretation and recommendation engine.

By providing the ability to sort and recommend various cloud provider services based on source code and user-defined requirements, one or more embodiments described herein provide another abstraction of Infrastructure as Code (IaC). Infrastructure as Code is the managing and provisioning of infrastructure through code instead of through manual processes. For example, configuration files are created that contain infrastructure specifications. Users (e.g., DevOps engineers) can specify the architecture in declarative syntax with vendor-neutral semantics, and one or more embodiments described herein can recommend suitable deployments for that system based on current cloud providers' offerings. This approach also responds dynamically to changing architecture requirements and availability and reliability of cloud provider services.

Figure 1A:
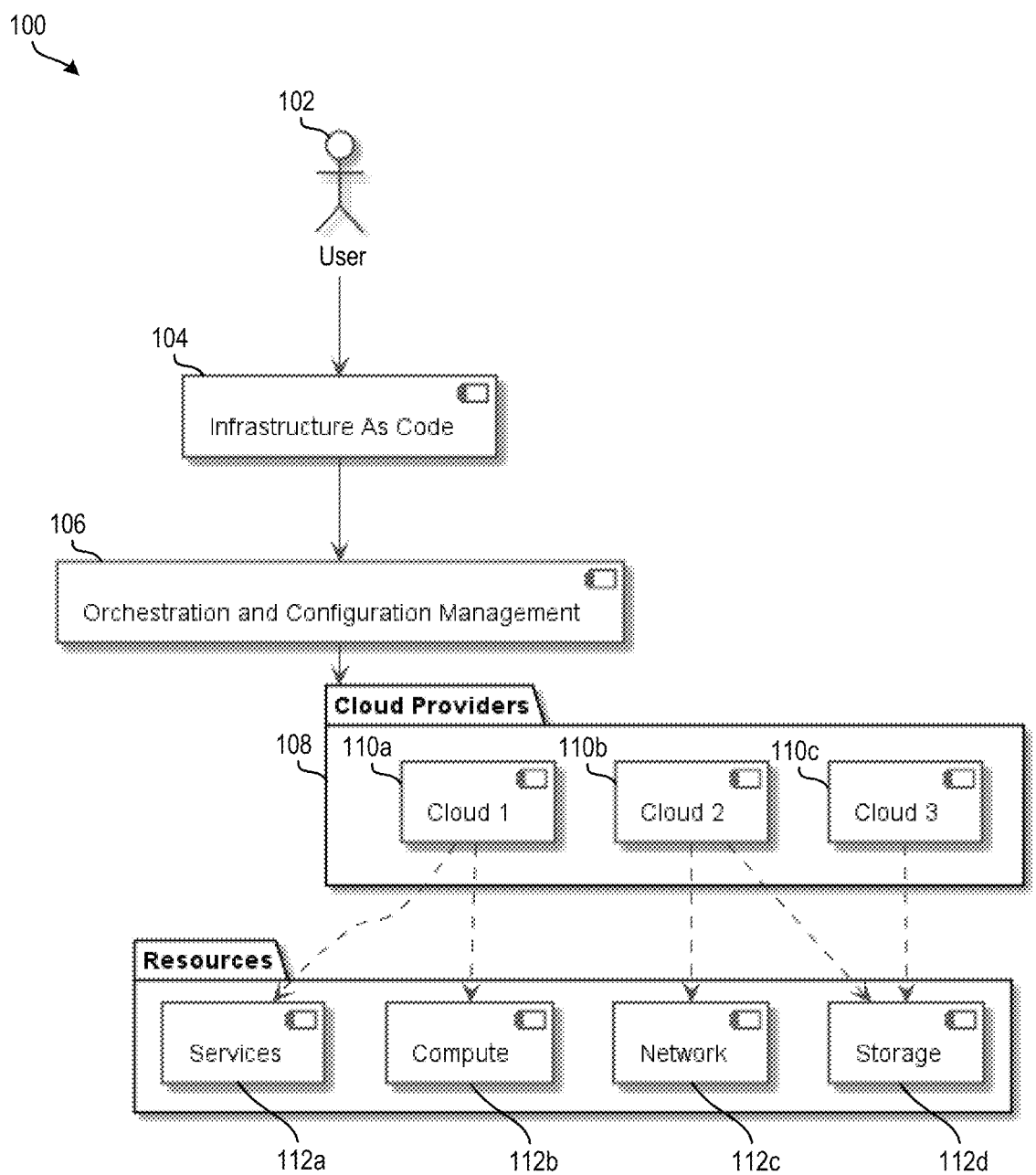
FIG. 1A depicts a block diagram of a conventional approach 100 for cloud implementations according to one or more embodiments described herein.

Conventional approaches for multi-cloud implementations using infrastructure as code do not provide for development teams to be in control of the implementation based on their requirements while simplifying the choices for them. FIG. 1A depicts a block diagram of a conventional approach 100 for cloud implementations according to one or more embodiments described herein. The approach 100 provides for infrastructure to be defined as code. In this example, individual cloud providers have individual IaC services. Some providers may provide a multi-cloud IaC, and modules for open source IaC for greater abstraction may be available. However, users are not able to specify requirements which are then used to aid the selection of the providers. For example, in the approach 100, a user 102 (e.g., a DevOps engineer) defines infrastructure as code 104, which is then passed to an orchestration/configuration management engine 106 that deploys the infrastructure as code 104 in one of a plurality of cloud providers 108 (e.g., the cloud providers 110a, 110b, 110c). Each of the cloud providers 110a, 110b, 110c is associated with resources 112a, 112b, 112c, 112d (e.g., a services resource, a compute resource, a network resource, a storage resource, etc.) that deploy an application for the user 102.

Figure 1B:
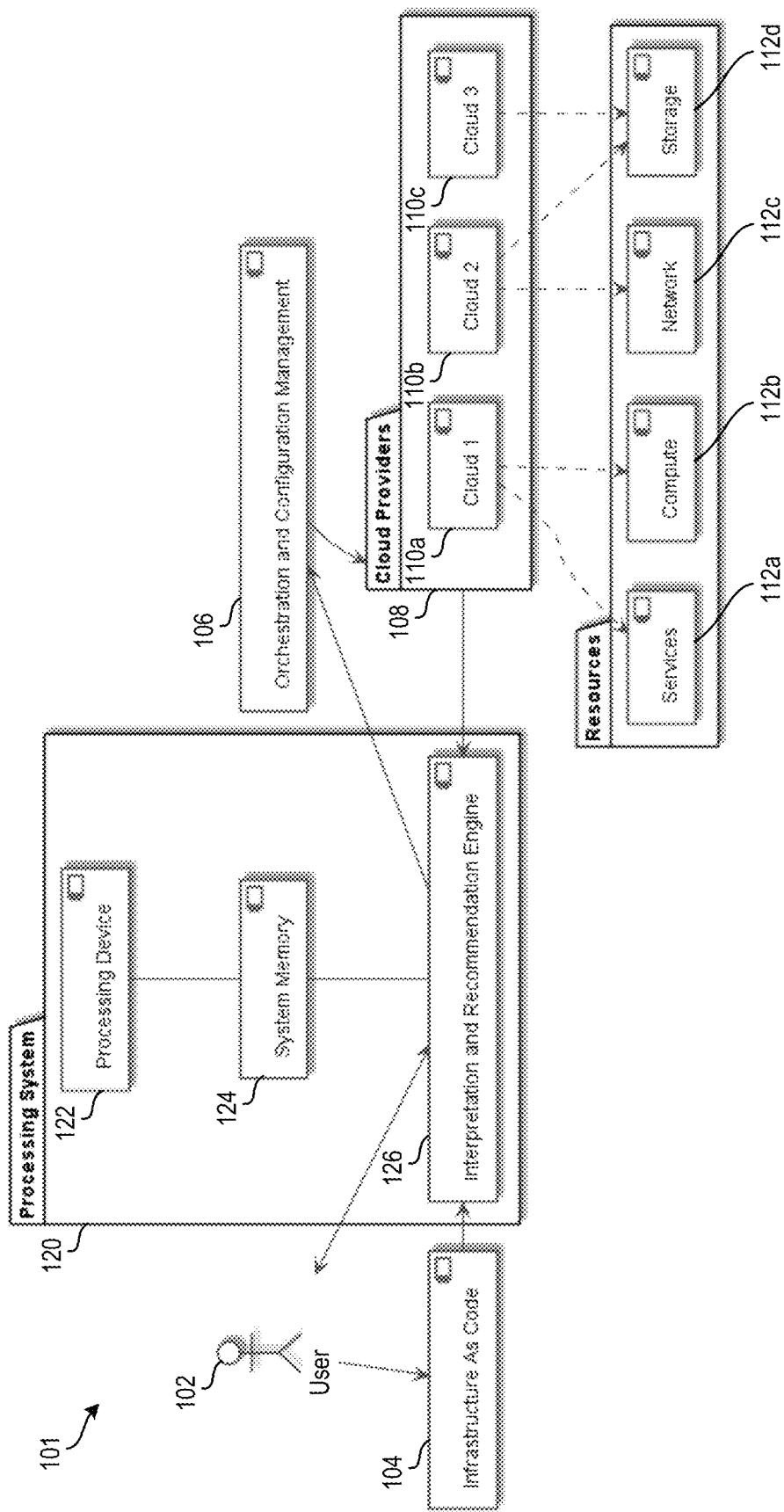
FIG. 1B depicts a block diagram of an approach 101 for cloud architecture interpretation and recommendation for a multi-cloud implementation according to one or more embodiments described herein.

One or more embodiments described herein address the shortcomings of the prior art by determining, based on received source code and user-defined requirements, multiple suitable cloud architectures to operate the source code on a cloud infrastructure. A selected cloud architecture for the cloud infrastructure can then be implemented. FIG. 1B depicts such an example. Particularly, FIG. 1B depicts a block diagram of an approach 101 for cloud architecture interpretation and recommendation for a multi-cloud implementation according to one or more embodiments described herein.

FIG. 1 includes a processing system 120 for cloud architecture interpretation and recommendation for a multi-cloud implementation. The processing system 120 includes a processing device 122 (e.g., one of the processors 721 of FIG. 7), a system memory 124 (e.g., the ROM 722 and/or the RAM 724 of FIG. 7), and an interpretation and recommendation engine 126 (also referred to as "IRE" or "IRE 126"). The interpretation and recommendation engine 126 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the interpretation and recommendation engine 126 can be a combination of hardware and programming. The programming can be processor executable instructions stored on a tangible memory, and the hardware can include the processing device 122 for executing those instructions. Thus the system memory 124 can store program instructions that when executed by the processing device 122 implement the interpretation and recommendation engine 126. Other engines can also be utilized to include other features and functionality described in other examples herein.

Figure 2:
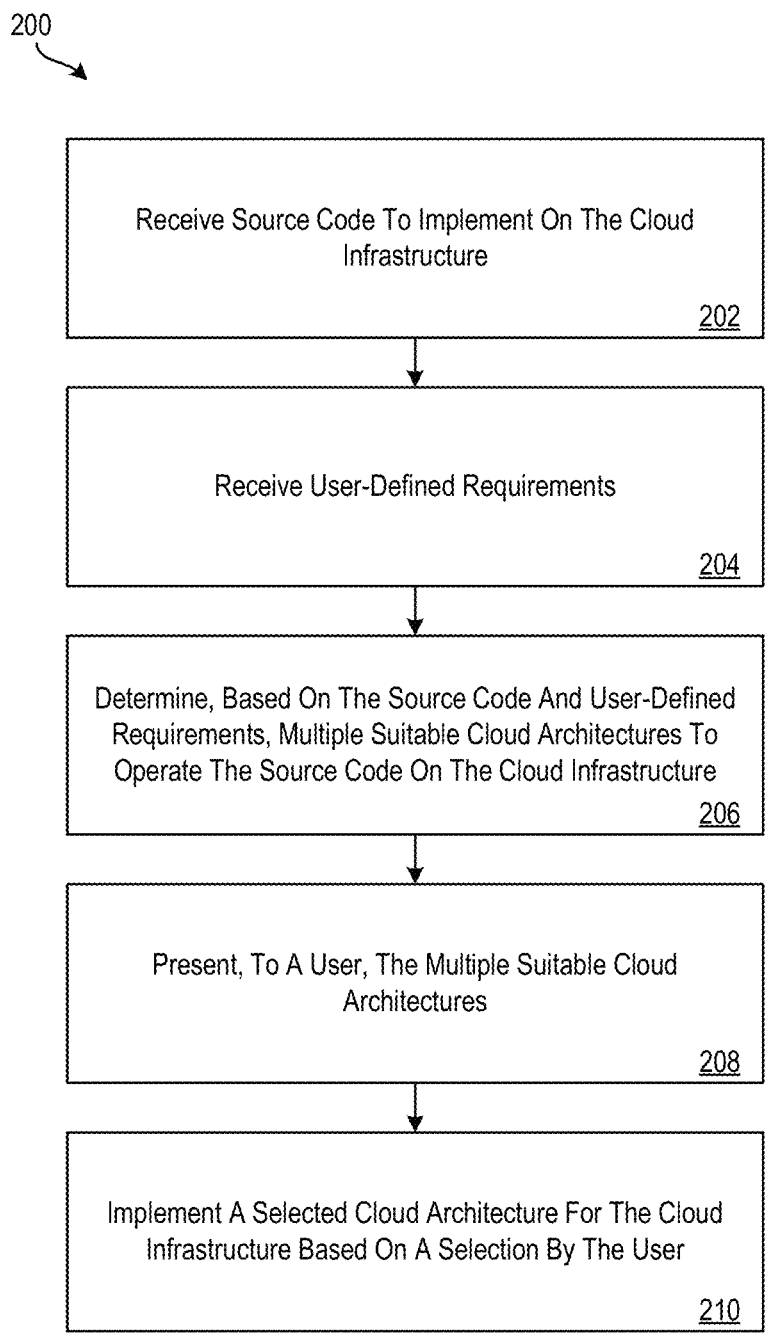
FIG. 2 depicts a flow diagram of a method for cloud architecture interpretation and recommendation for a multi-cloud implementation according to one or more embodiments described herein.

FIG. 2 depicts a flow diagram of a method 200 for cloud architecture interpretation and recommendation for a multi-cloud implementation according to one or more embodiments described herein. The method 200 can be implemented using any suitable system and/or device, such as the processing system 120 of FIG. 1B, the one or more cloud computing nodes 10 of FIG. 5, the processing system 700 of FIG. 7, and the like, including combinations thereof. FIG. 2 is now described with reference to the approach 101 of FIG. 1B.

At block 202, under the approach 101 of FIG. 1B, the processing system 120 receives source code to implement on the cloud infrastructure. The source code can be received from the user 102 or another source, such as a code repository (not shown).

At block 204, the processing system 120 receives user-defined requirements. Particularly, the user 102 defines one or more user-defined requirements, which may be cost, location, performance, diversity, availability, etc., relating to cloud service providers. For example, a user-defined requirement may be a bandwidth cost limit. As another example, a user-defined requirement is a requirement that hardware (e.g., servers) be located within a particular region/jurisdiction/country. As another example, a user-defined requirement is a performance requirement (e.g., a particular amount of memory, storage, or processing resources). These and other user-defined requirements are possible, including combinations thereof. The user also defines infrastructure as code 104. The infrastructure as code 104 includes program code for an application to be deployed on one or more cloud provider's cloud resources as well as infrastructure as code implementation code.

Figure 4A:
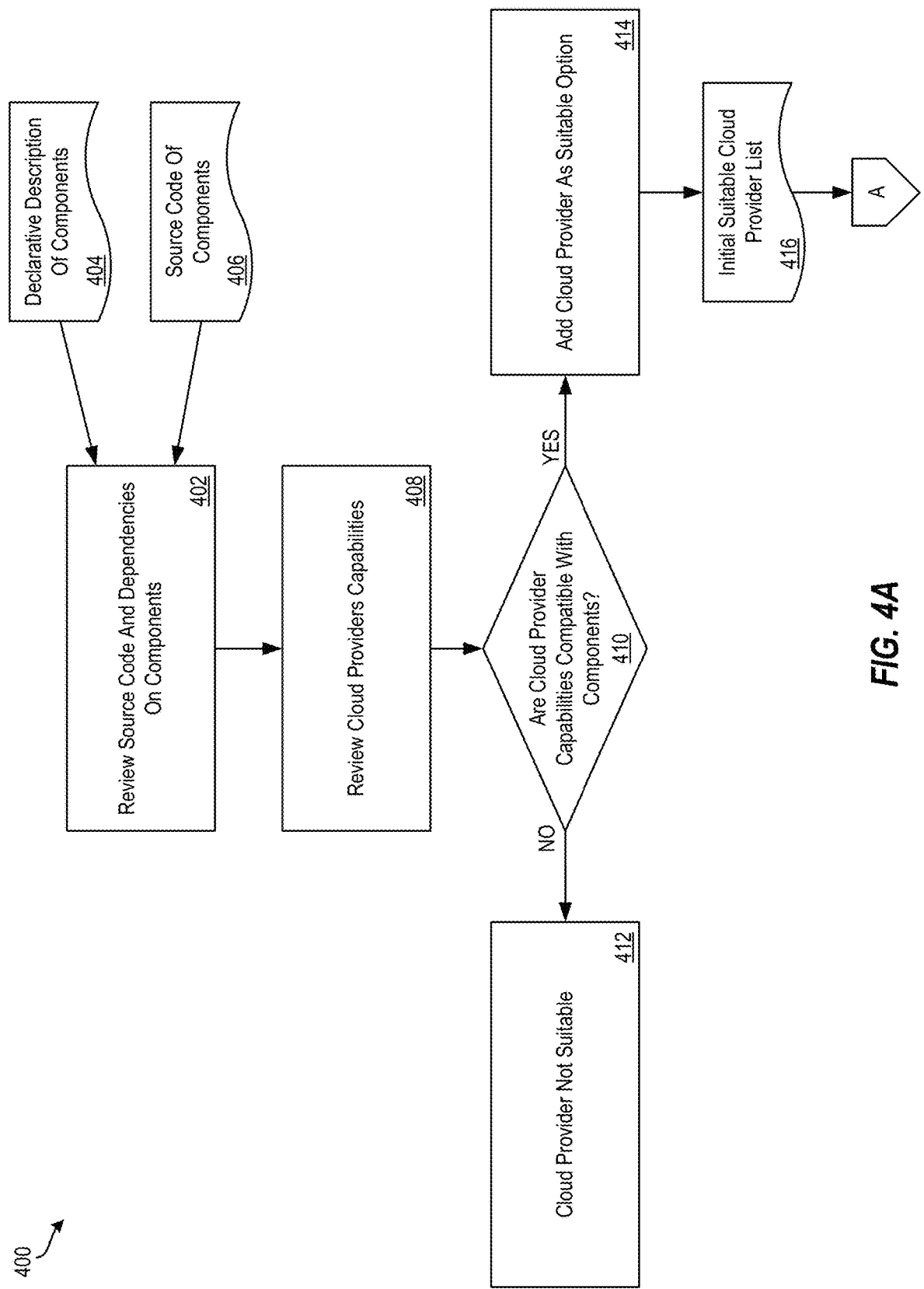
FIGS. 4A and 4B together depict a flow diagram of a method for cloud architecture interpretation and recommendation for a multi-cloud implementation according to one or more embodiments described herein.
Figure 4B:
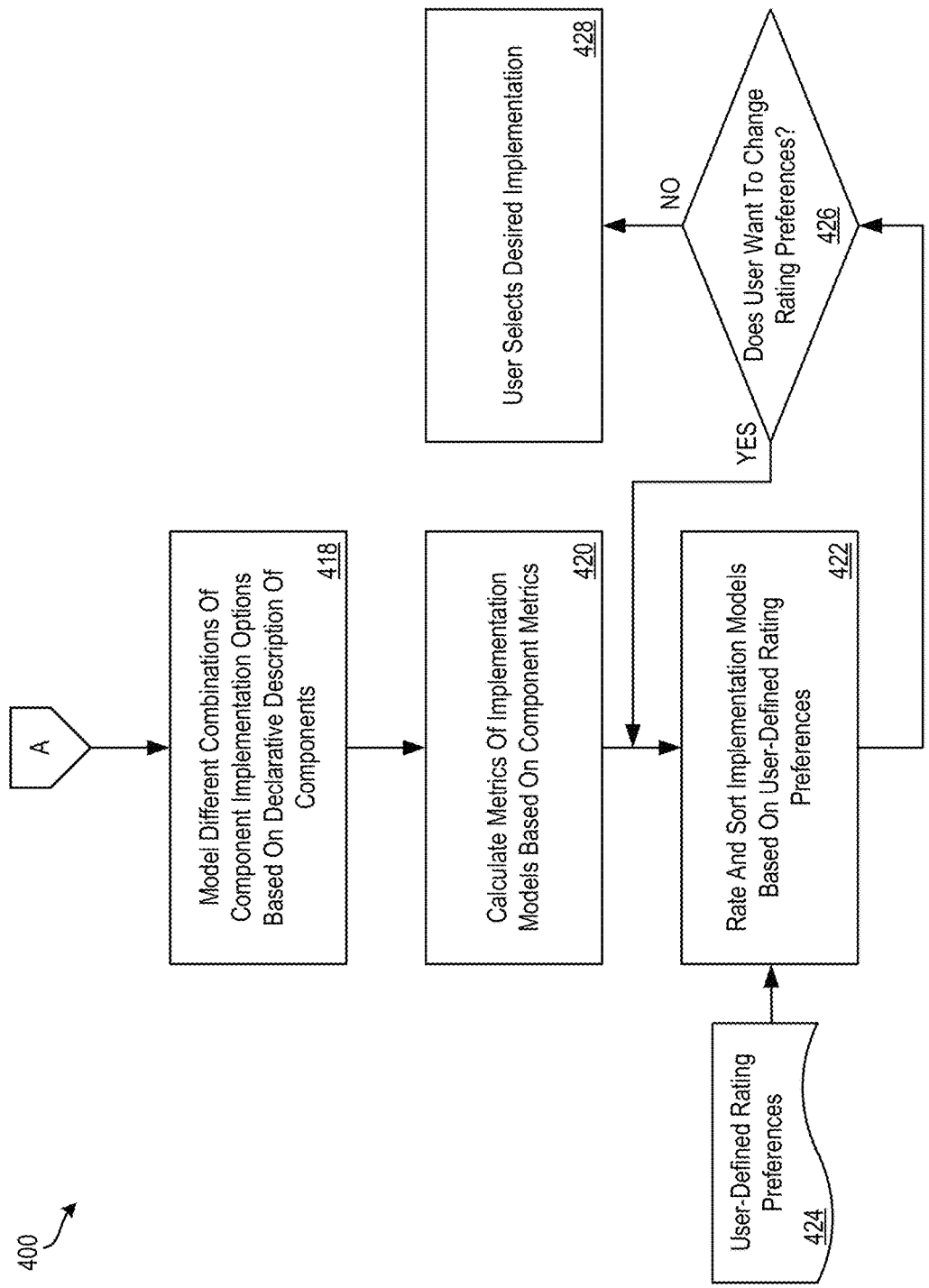

The user-defined requirements and the infrastructure as code 104 are sent to the interpretation and recommendation engine 126. At block 206, the interpretation and recommendation engine 126 determines multiple suitable cloud architectures to operate the source code on the cloud infrastructure. The description regarding FIGS. 4A and 4B provides further details about how the interpretation and recommendation engine 126 determines the multiple suitable cloud architectures to operate the source code on the cloud infrastructure. At block 208, the interpretation and recommendation engine 126 presents to the user 102 (such as on a display of a processing system associated with the user 102 (not shown)) the multiple suitable cloud architectures. The user 102 selects one or more of the multiple suitable cloud architectures, and then, at block 210, the interpretation and recommendation engine 126 causes the selected one or more of the multiple suitable cloud architectures to be implemented. For example, the interpretation and recommendation engine 126 causes the orchestration/configuration management engine 106 to deploy the infrastructure as code 104 at one or more of the cloud providers 110a, 110b, 110c using associated resources 112a, 112b, 112c, 112d to deploy the application (e.g., the application defined in the infrastructure as code 104) for the user 102.

The approach 101 removes complexity in hybrid cloud environment while understanding understands cloud provider capabilities in view of user-defined requirements. This approach enables users to define requirements (e.g., cost, location, performance, diversity, availability, etc.) and provide recommendations for one or more suitable cloud vendors. Further, this approach avoids vendor-specific software development kits (SDKs) used in application development.

Additional processes also may be included, and it should be understood that the process depicted in FIG. 2 represents an illustration, and that other processes may be added or existing processes may be removed, modified, or rearranged without departing from the scope of the present disclosure.

Figure 3:
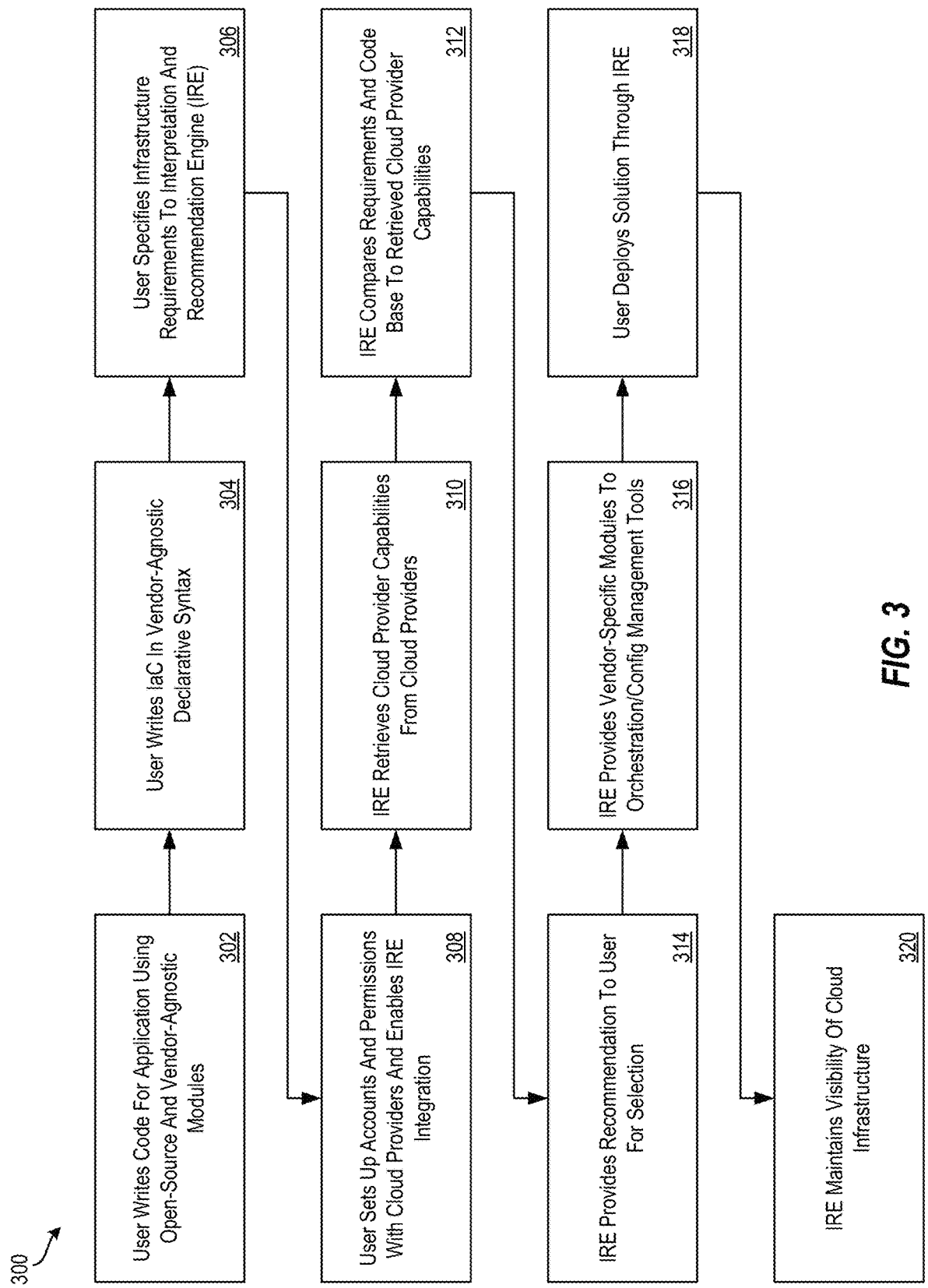
FIG. 3 depicts a flow diagram of a method for cloud architecture interpretation and recommendation for a multi-cloud implementation according to one or more embodiments described herein.

FIG. 3 depicts a flow diagram of a method for cloud architecture interpretation and recommendation for a multi-cloud implementation according to one or more embodiments described herein. The method 300 can be implemented using any suitable system and/or device, such as the processing system 120 of FIG. 1B, the one or more cloud computing nodes 10 of FIG. 5, the processing system 700 of FIG. 7, and the like, including combinations thereof. FIG. 3 is now described with reference to the approach 101 of FIG. 1B.

At block 302, the user 102 writes code for an application. This can be done using open-source and/or vendor-agnostic modules.

At block 304, the user 102 writes the IaC 104 in vendor-agnostic declarative syntax. This defines the parameters of the IaC 104. This can include, for example, the user 102 creating configuration files that contain infrastructure specifications. The user 102 (e.g., DevOps engineers) can specify the architecture in declarative syntax with vendor-neutral semantics.

At block 306, the user 102 specifies infrastructure requirements (i.e., "user-defined requirements") as described herein. For example, the user 102 defines one or more user-defined requirements, which may be cost, location, performance, diversity, availability, etc., relating to cloud service providers.

At block 308, the user 102 sets up accounts with one or more of the cloud providers 108 (e.g., the cloud providers 110a, 110b, 110c). The user 102 can also define permissions and enable integration between the respective one or more cloud providers 108 and the interpretation and recommendation engine 126.

At block 310, the interpretation and recommendation engine 126 retrieves cloud provider capabilities from the cloud providers 108. Cloud provider capabilities include what resources are available (e.g., processing resources, memory resources, data storage resources, bandwidth resources, etc.), geographical information (e.g., where resources are located), availability, costs, and other information.

At block 312, the interpretation and recommendation engine 126 compares the user-defined requirements and the code base of the application to the cloud provider capabilities. As is further described with reference to FIGS. 4A and 4B, the interpretation and recommendation engine 126 determines, and in some examples ranks, suitable cloud service providers based on the user-defined requirements and the code based for the application.

At block 314, the interpretation and recommendation engine 126 presents a recommendation of multiple suitable cloud service providers to the user 102 for selection by the user 102. From the multiple suitable cloud service providers, the user 102 can select a selected cloud provider (or multiple selected cloud providers) from the plurality of cloud providers 108.

At block 316, the interpretation and recommendation engine 126 provides vendor-specific modules to the orchestration/configuration management engine 106 based on the selected cloud provider.

At block 318, the user 102 deploys the application using the interpretation and recommendation engine 126 based on the selected cloud provider (or multiple selected cloud providers). This causes the application to be deployed based on the selection of the user 102.

At block 320, the interpretation and recommendation engine 126 maintains visibility of the cloud infrastructure and monitors (e.g., continuously, periodically, responsive to a trigger event, etc.) the selected cloud provider(s) and the user-defined requirements to detect changes. If changes are detected to either of the selected cloud provider(s) or the user-defined requirements (or to non-selected cloud providers such that they become suitable), the interpretation and recommendation engine 126 can present updated multiple suitable cloud architectures for selection by the user 102. If a change is desired by the user 102, the user can select a new or additional cloud provider, and the application to be deployed based on the selection of the user 102. By providing for such updating, cloud computing is improved by accounting for changes to user-defined requirements and/or changes to cloud providers' offerings. Thus, an improved instance can be implemented where changes to one or more of the user-defined requirements and/or changes to cloud providers' offerings.

Additional processes also may be included, and it should be understood that the process depicted in FIG. 3 represents an illustration, and that other processes may be added or existing processes may be removed, modified, or rearranged without departing from the scope of the present disclosure.

FIGS. 4A and 4B together depict a flow diagram of a method for cloud architecture interpretation and recommendation for a multi-cloud implementation according to one or more embodiments described herein. The method 400 can be implemented using any suitable system and/or device, such as the processing system 120 of FIG. 1B, the one or more cloud computing nodes 10 of FIG. 5, the processing system 700 of FIG. 7, and the like, including combinations thereof. The method 400 is an example of the analysis performed by the interpretation and recommendation engine 126 at block 312 of FIG. 3. FIGS. 4A and 4B are now described with reference to the approach 101 of FIG. 1B.

At block 402, the interpretation and recommendation engine 126 reviews the source code for the application and its dependencies on certain components. The interpretation and recommendation engine 126 receives a declarative description of components 404 (e.g., user-defined requirements) and source code of the components 406 from the user 102 and/or IaC 104.

At block 408, the interpretation and recommendation engine 126 reviews cloud providers' capabilities. The cloud provider's capabilities can be received from each of the cloud providers 110a, 110b, 110c.

At decision block 410, it is determined, for each cloud provider, whether the cloud provider's capabilities are compatible with the components. If it determined at decision block 410 that one or more cloud providers capabilities are not compatible with the components, then the cloud provider is indicated as being not suitable at block 412.

However, if it determined at decision block 410 that one or more cloud providers capabilities are compatible with the components, then at block 414, the cloud provider is included as a suitable option, and an initial list of suitable cloud provider list is generated at block 416.

The method 400 then proceeds to block 418 (see FIG. 4B), where the interpretation and recommendation engine 126 models different combinations of component implementation options based on the declarative description of components 404. For example, the interpretation and recommendation engine 126 constructs different implementation models based on the declarative descriptions. The services from the cloud providers 108 are imported, classified, and stored in a database. When modeling different combinations of implementation options, the interpretation and recommendation engine 126 reviews the database for compatible services based on the code base and inputs from the user. The interpretation and recommendation engine 126 then produces an output of different component combinations in accordance with the defined architecture and parameters. At block 420, the interpretation and recommendation engine 126 calculates metrics of the implementation models (from block 418) based on component metrics. Component metrics can be scored based on a multitude of factors, such as cost, availability, performance, location, and/or global coverage. At block 422, the interpretation and recommendation engine 126 then rates and sorts the implementation models based on user-defined rating preferences 424. The user-defined rating preferences 424 define how the user 102 wants the user-defined preferences to be weighted (e.g., a geographic preference is more important to the user than a cost preference, thus the geographic preference would be higher weighted than the cost preference.

At decision block 426, it can then be determined whether the user wants to change the user-defined rating preferences. If so, the method 400 returns to block 422 for updating. If not, however, the method proceeds to block 438, and the user 102 selects the desired implementation.

Additional processes also may be included, and it should be understood that the process depicted in FIGS. 4A and 4B represents an illustration, and that other processes may be added or existing processes may be removed, modified, or rearranged without departing from the scope of the present disclosure.

The following provides an example use case and is provided for exemplary purposes but is not intended to be limiting.

Alice is a DevOps engineer working on a new three-tier application for New Project X. Alice describes the architecture in requirements in high-level declarative code that is vendor-agnostic as follows: Repo W code runs in NodeJS on Docker, requires Layer 7 load balancing, requires 128 GB memory per instance, etc.; Repo A code runs in Python, must be able to receive events, requires Layer 4 Load Balancing; Relational Database that supports SQLAlchemy, 1 TB storage, automated HA, IO for low latency write operations. The interpretation and recommendation engine 126 reads the source code and declarative code and lists supported instantiations. Alice sorts and filters implementations based on location, complexity, administrative overhead, and/or peer rating and selects an instantiation. The interpretation and recommendation engine 126 collects information related to billing, accounts, environment variables, and/or specifications. The orchestration/configuration management engine 106 builds the vendor-specific IaC configurations to deploy the solution. Alice deploys the multi-cloud instantiation of the three-tier application.

Bob is a DevOps engineer responsible for the Continuous integration/continuous delivery (CI/CD) pipeline for an application. Bob describes the architecture in requirements in high-level declarative code that is vendor-agnostic and has deployed the architecture leveraging the system as described by the previous use case. An update is made to the application source code: a webhook triggers the system to re-evaluate the application source code. The interpretation and recommendation engine 126 detects that an additional dependency on boto3 was added. The interpretation and recommendation engine 126 flags that dependency as incompatible with the current implementation. The DevOps engineer (Bob) is presented with an alert on the incompatibility. As part of the CI process, the incompatibility alert can be treated as a failed test and the commit is rejected. The DevOps engineer (Bob) could accept that code change. The interpretation and recommendation engine 126 will then provide a new set of implementations and the solution can be deployed to that recommended implementation.

Alice has a deployed architecture with strict cost and reliability requirements. Alice leveraged the system as described in the first use case to configure her vendor-agnostic architecture, cost, and reliability requirements, and the system built the vendor-specific IaC configurations to deploy a solution based on those requirements. Recently, the vendor that was selected to best meet the vendor-agnostic declarative requirement for "Repo W code runs in NodeJS on Docker, requires Layer 7 load balancing, requires 128 GB memory per instance and 99.99% SLA" has been experiencing service outages that fall below Alice's 99.8% uptime requirement. Additionally, since deployment of Alice's architecture, several new vendors have entered the market, offering competitive pricing. The interpretation and recommendation engine 126 continuously monitors Alice's deployed environment, as well as to-date market offerings, and flags incompatibilities in price and reliability with the current implementation. It identifies a new vendor that meets Alice's uptime requirement and surpasses her cost requirement. Alice is presented with an alert on the incompatibility and an updated build with the new vendor-specific IaC configurations to deploy. Alice deploys the updated architecture for her application through the interpretation and recommendation engine 126 and/or orchestration/configuration management engine 106.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
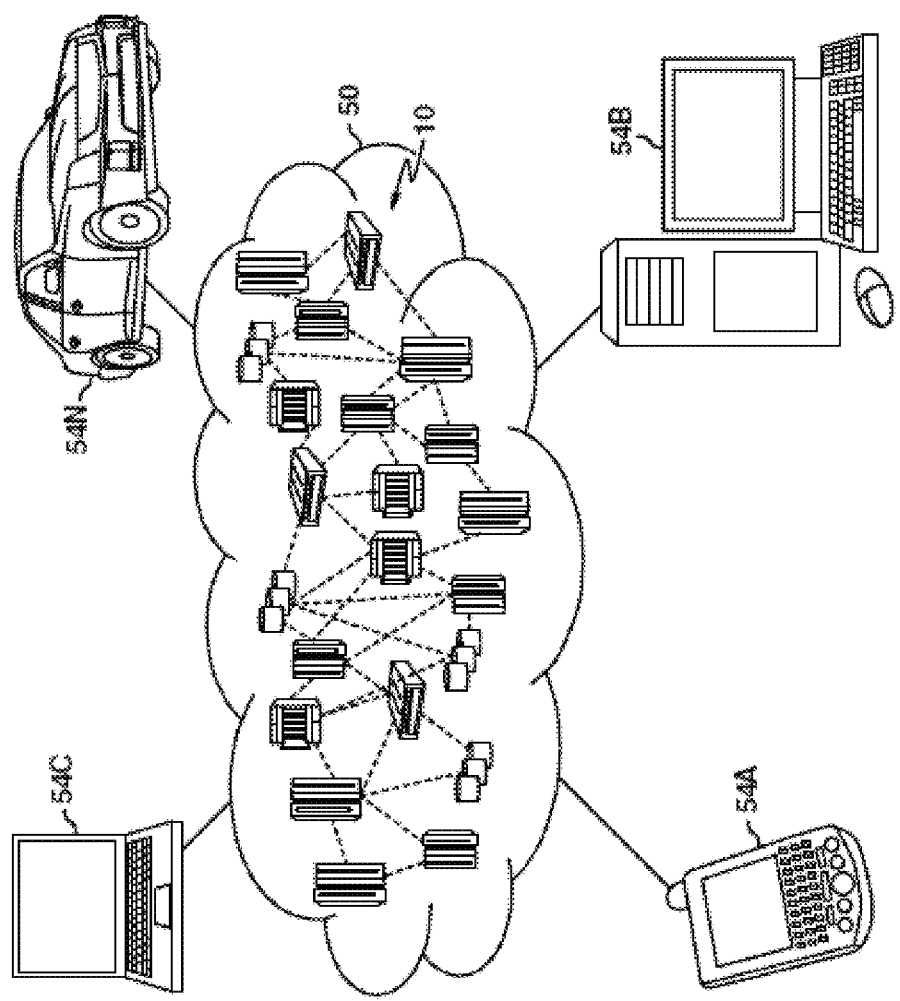
FIG. 5 depicts a cloud computing environment according to one or more embodiments described herein.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
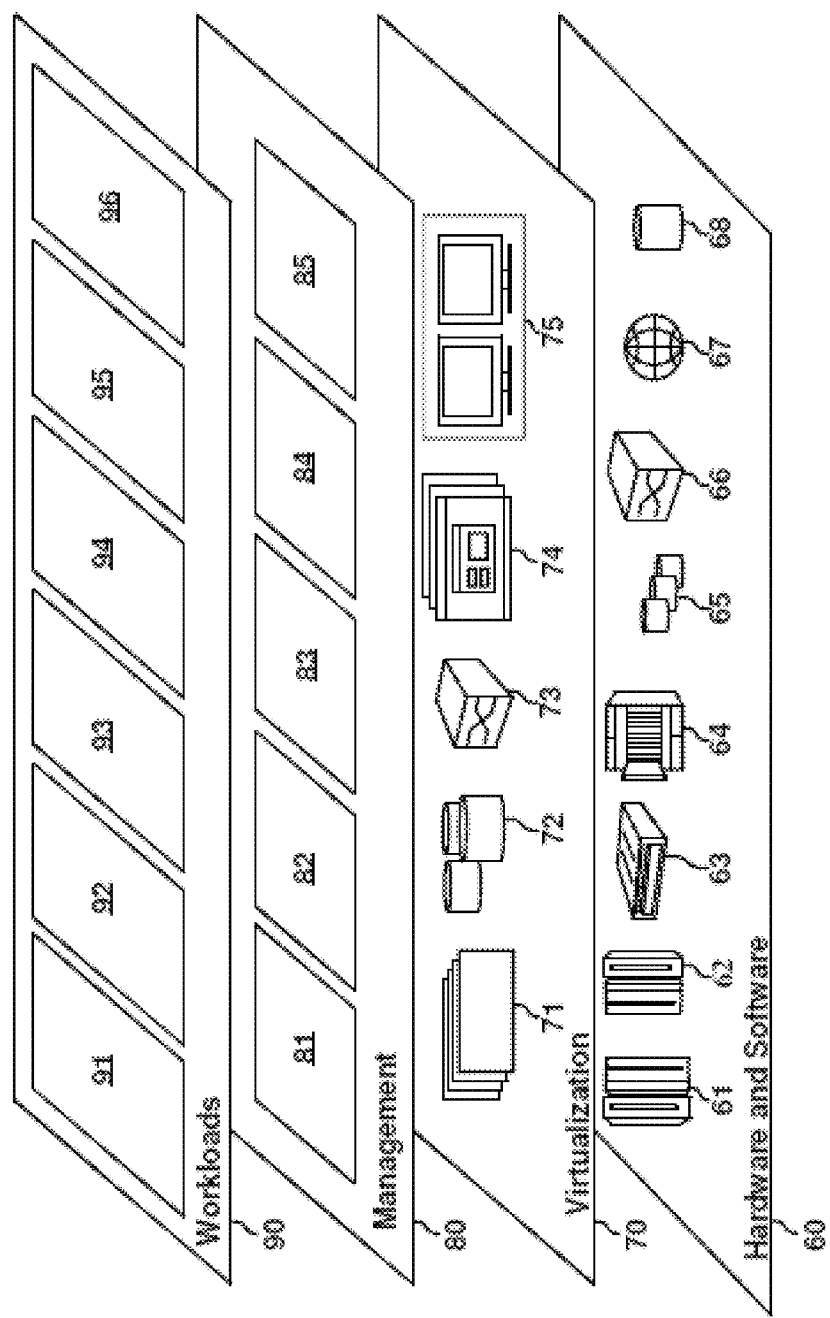
FIG. 6 depicts abstraction model layers according to one or more embodiments described herein.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cloud architecture interpretation and recommendation for a multi-cloud implementation 96.

Figure 7:
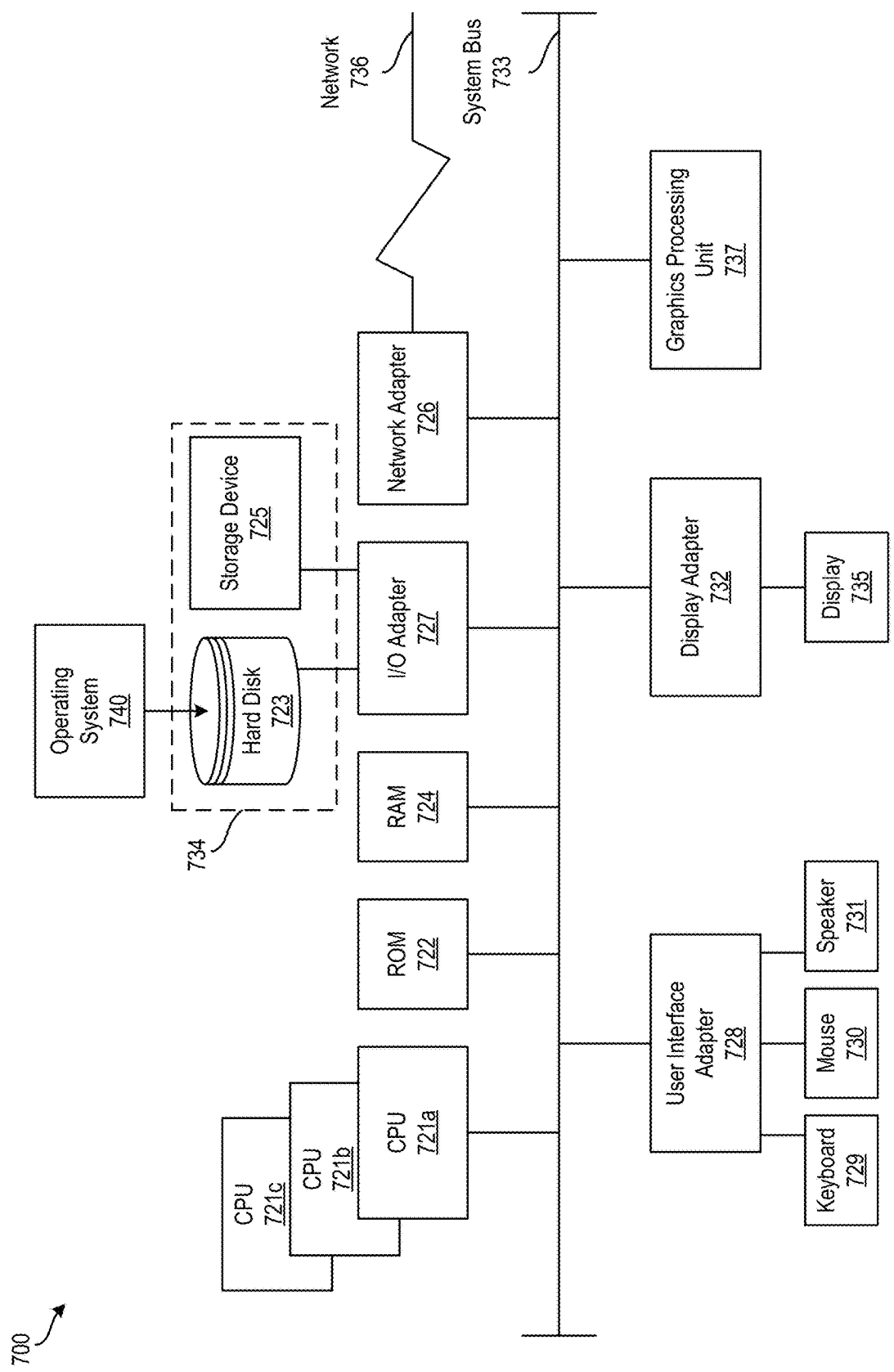
FIG. 7 depicts a block diagram of a processing system for implementing the presently described techniques according to one or more embodiments described herein.

It is understood that one or more embodiments described herein is capable of being implemented in conjunction with any other type of computing environment now known or later developed. For example, FIG. 7 depicts a block diagram of a processing system 700 for implementing the techniques described herein. In accordance with one or more embodiments described herein, the processing system 700 is an example of a cloud computing node 10 of FIG. 5. In examples, processing system 700 has one or more central processing units ("processors" or "processing resources") 721a, 721b, 721c, etc. (collectively or generically referred to as processor(s) 721 and/or as processing device(s)). In aspects of the present disclosure, each processor 721 can include a reduced instruction set computer (RISC) microprocessor. Processors 721 are coupled to system memory (e.g., random access memory (RAM) 724) and various other components via a system bus 733. Read only memory (ROM) 722 is coupled to system bus 733 and may include a basic input/output system (BIOS), which controls certain basic functions of processing system 700.

Further depicted are an input/output (I/O) adapter 727 and a network adapter 726 coupled to system bus 733. I/O adapter 727 may be a small computer system interface (SCSI) adapter that communicates with a hard disk 723 and/or a storage device 725 or any other similar component. I/O adapter 727, hard disk 723, and storage device 725 are collectively referred to herein as mass storage 734. Operating system 740 for execution on processing system 700 may be stored in mass storage 734. The network adapter 726 interconnects system bus 733 with an outside network 736 enabling processing system 700 to communicate with other such systems.

A display (e.g., a display monitor) 735 is connected to system bus 733 by display adapter 732, which may include a graphics adapter to improve the performance of graphics intensive applications and a video controller. In one aspect of the present disclosure, adapters 726, 727, and/or 732 may be connected to one or more I/O busses that are connected to system bus 733 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 733 via user interface adapter 728 and display adapter 732. A keyboard 729, mouse 730, and speaker 731 may be interconnected to system bus 733 via user interface adapter 728, which may include, for example, a Super I/O chip integrating multiple device adapters into a single integrated circuit.

In some aspects of the present disclosure, processing system 700 includes a graphics processing unit 737. Graphics processing unit 737 is a specialized electronic circuit designed to manipulate and alter memory to accelerate the creation of images in a frame buffer intended for output to a display. In general, graphics processing unit 737 is very efficient at manipulating computer graphics and image processing, and has a highly parallel structure that makes it more effective than general-purpose CPUs for algorithms where processing of large blocks of data is done in parallel.

Thus, as configured herein, processing system 700 includes processing capability in the form of processors 721, storage capability including system memory (e.g., RAM 724), and mass storage 734, input means such as keyboard 729 and mouse 730, and output capability including speaker 731 and display 735. In some aspects of the present disclosure, a portion of system memory (e.g., RAM 724) and mass storage 734 collectively store the operating system 740 such as the AIX® operating system from IBM Corporation to coordinate the functions of the various components shown in processing system 700.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of creating a cloud infrastructure comprising:
    receiving declarative code and source code for implementation on the cloud infrastructure, wherein the source code is part of a code base;
    receiving user-defined requirements;
    generating a list of instantiations by reading the source code and the declarative code;
    selecting an instantiation from the list of instantiations;
    collecting instantiation information relating to at least one of billing, accounts, environment variables and specifications of the instantiation;
    retrieving cloud provider capabilities for a plurality of cloud providers, wherein the cloud provider capabilities include one or more of available processing resources, available memory resources, available data storage resources, available bandwidth resources, geographical location information of resources and service costs;
    comparing the code base, the declarative code, the instantiation information and the user-defined requirements with the cloud provider capabilities to determine multiple suitable cloud architectures from the plurality of cloud providers to operate the source code on the cloud infrastructure;
    modeling different combinations of component implementation options based on the user-defined requirements and a user-defined rating preference, wherein the user-defined rating preference is weighted based on importance to the user;

prior to presenting the multiple suitable cloud architectures, ranking the multiple suitable cloud architectures as a ranked list of the multiple suitable cloud architectures;

presenting, to a user, the multiple suitable cloud architectures, wherein presenting the multiple suitable cloud architectures comprises presenting the ranked list of the multiple suitable cloud architectures;

implementing a selected cloud architecture for the cloud infrastructure based on a selection by the user; and deploying the instantiation on the selected cloud architecture.

2. The computer-implemented method of claim 1, further comprising:

prior to presenting the multiple suitable cloud architectures, ranking the multiple suitable cloud architectures as a ranked list, wherein presenting the multiple suitable cloud architectures comprises presenting the ranked list.

3. The computer-implemented method of claim 1, wherein the ranking is based at least in part on the user-defined rating preference, wherein the user-defined rating preference includes at least one of a cost, an availability, a performance, a location, and/or a global coverage is of greater importance based on the user-defined requirements.

4. The computer-implemented method of claim 1, further comprising:

monitoring the user-defined requirements and the plurality of cloud providers to detect a change to at least one of the user-defined requirements or the plurality of cloud providers.

5. The computer-implemented method of claim 4, further comprising:

responsive to detecting a change to the at least one of the user-defined requirements or the plurality of cloud providers, presenting an updated multiple suitable cloud architectures for selection by the user.

6. The computer-implemented method of claim 5, further comprising:

responsive to receiving a new selection from the user selecting from the updated multiple suitable cloud, implementing an updated selected cloud architecture for the cloud infrastructure based on the new selection by the user.

7. The computer-implemented method of claim 1, wherein the user-defined requirements are selected from the group consisting of a cost requirement, a location requirement, a performance requirement, a diversity requirement, and an availability requirement.

8. A system comprising:

a memory comprising computer readable instructions; and a processing device for executing the computer readable instructions, the computer readable instructions controlling the processing device to perform operations for creating a cloud infrastructure comprising:

receiving declarative code and source code for implementation on the cloud infrastructure, wherein the source code is part of a code base;

receiving user-defined requirements;

generating a list of instantiations by reading the source code and the declarative code;

selecting an instantiation from the list of instantiations;

collecting instantiation information relating to at least one of billing, accounts, environment variables and specifications of the instantiation;

retrieving cloud provider capabilities for a plurality of cloud providers, wherein the cloud provider capabilities include one or more of available processing resources, available memory resources, available data storage resources, available bandwidth resources, geographical location information of resources and service costs;

identifying, based on the code base, the declarative code, the instantiation information, the user-defined requirements and cloud provider capabilities, multiple suitable cloud architectures from the plurality of cloud providers to operate the source code and the declarative code on the cloud infrastructure;

modeling different combinations of component implementation options based on the user-defined requirements and a user-defined rating preference, wherein the user-defined rating preference is weighted based on importance to the user;

prior to presenting the multiple suitable cloud architectures, ranking the multiple suitable cloud architectures as a ranked list of the multiple suitable cloud architectures;

presenting, to a user, the multiple suitable cloud architectures, wherein presenting the multiple suitable cloud architectures comprises presenting the ranked list of the multiple suitable cloud architectures;

implementing a selected cloud architecture for the cloud infrastructure based on a selection by the user; and deploying the instantiation on the selected cloud architecture.

9. The system of claim 8, wherein the ranking is based at least in part on the user-defined rating preference, wherein the user-defined rating preference includes at least one of a cost, an availability, a performance, a location, and/or a global coverage is of greater importance based on the user-defined requirements.

10. The system of claim 8, the processing device to perform operations further comprising:

monitoring the user-defined requirements and the plurality of cloud providers to detect a change to at least one of the user-defined requirements or the plurality of cloud providers.

11. The system of claim 10, the processing device to perform operations further comprising:

responsive to detecting a change to the at least one of the user-defined requirements or the plurality of cloud providers, presenting an updated multiple suitable cloud architectures for selection by the user.

12. The system of claim 11, the processing device to perform operations further comprising:

responsive to receiving a new selection from the user selecting from the updated multiple suitable cloud, implementing an updated selected cloud architecture for the cloud infrastructure based on the new selection by the user.

13. The system of claim 8, wherein the user-defined requirements are selected from the group consisting of a cost requirement, a location requirement, a performance requirement, a diversity requirement, and an availability requirement.

14. A computer program product comprising a computer readable storage medium having program instructions embodied therewith, the program instructions executable by a processing device to cause the processing device to perform operations creating a cloud infrastructure comprising:
  receiving declarative code and source code for implementation on the cloud infrastructure, wherein the source code is part of a code base;
  receiving user-defined requirements;
    generating a list of instantiations by reading the source code and the declarative code;
    selecting an instantiation from the list of instantiations;
    collecting instantiation information relating to at least one of billing, accounts, environment variables and specifications of the instantiation;
  retrieving cloud provider capabilities for a plurality of cloud providers, wherein the cloud provider capabilities include one or more of available processing resources, available memory resources, available data storage resources, available bandwidth resources, geographical location information of resources and service costs;
  identifying, based on the code base, the declarative code, the instantiation information, the user-defined requirements and cloud provider capabilities, multiple suitable cloud architectures from the plurality of cloud providers to operate the source code and the declarative code on the cloud infrastructure;
  modeling different combinations of component implementation options based on the user-defined requirements and a user-defined rating preference, wherein the user-defined rating preference is weighted based on importance to the user;
  prior to presenting the multiple suitable cloud architectures, ranking the multiple suitable cloud architectures as a ranked list of the multiple suitable cloud architectures;
  presenting, to a user, the multiple suitable cloud architectures, wherein presenting the multiple suitable cloud architectures comprises presenting the ranked list of the multiple suitable cloud architectures;
  implementing a selected cloud architecture for the cloud infrastructure based on a selection by the user; and
  deploying the instantiation on the selected cloud architecture.

15. The computer program product of claim 14, wherein the ranking is based at least in part on the user-defined rating preference, wherein the user-defined rating preference includes at least one of a cost, an availability, a performance, a location, and/or a global coverage is of greater importance based on the user-defined requirements.

16. The computer program product of claim 14, the processing device to perform operations further comprising:
  monitoring the user-defined requirements and the plurality of cloud providers to detect a change to at least one of the user-defined requirements or the plurality of cloud providers.

17. The computer program product of claim 16, the processing device to perform operations further comprising:
  responsive to detecting a change to the at least one of the user-defined requirements or the plurality of cloud providers, presenting an updated multiple suitable cloud architectures for selection by the user.

18. The computer program product of claim 17, the processing device to perform operations further comprising:
  responsive to receiving a new selection from the user selecting from the updated multiple suitable cloud, implementing an updated selected cloud architecture for the cloud infrastructure based on the new selection by the user.

* * * * *